L. GUEDESSE.
FLOAT VALVE.
APPLICATION FILED DEC. 24, 1908.
916,927.
Patented Mar. 30, 1909.
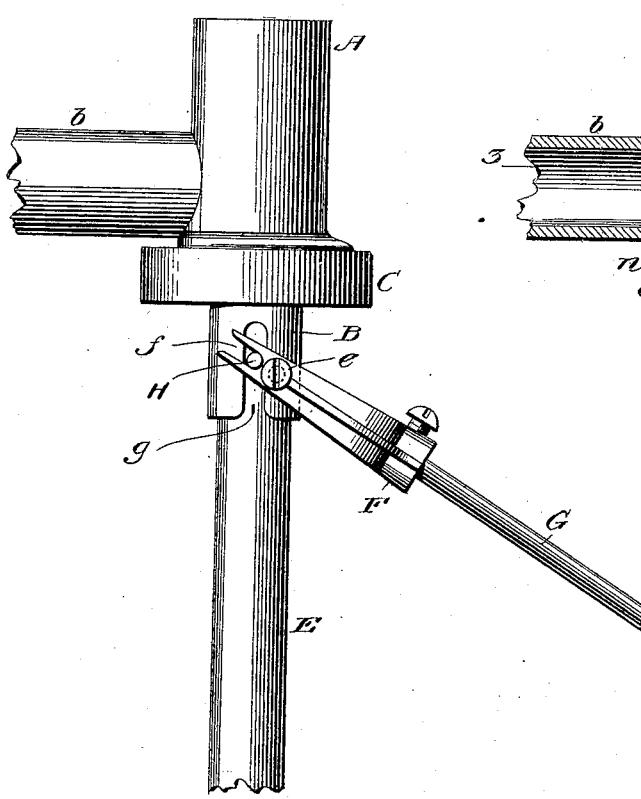
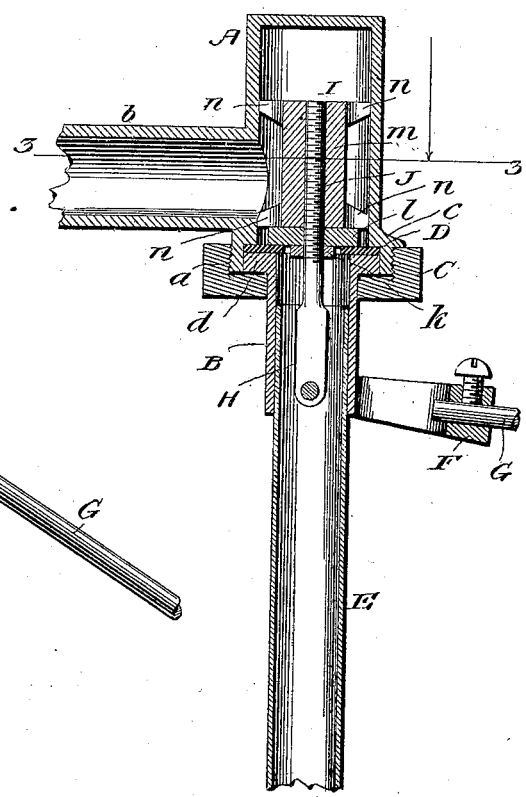
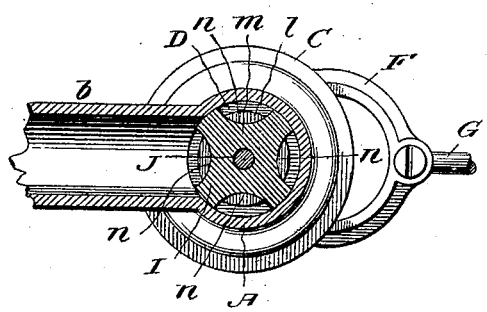

UNITED STATES PATENT OFFICE.

LOUIS GUEDESSE, OF WOONSOCKET, RHODE ISLAND.

FLOAT-VALVE.

No. 916,927.  Specification of Letters Patent.  Patented March 30, 1909.

Application filed December 24, 1908. Serial No. 469,038.

*To all whom it may concern:*

Be it known that I, LOUIS GUEDESSE, citizen of the United States, residing at Woonsocket, in the county of Providence and State of Rhode Island, have invented new and useful Improvements in Float-Valves, of which the following is a specification.

My invention pertains to float valves such as are ordinarily used in the flushing tanks of water-closets to control the supply of water thereto; and it has for its object to provide a simple, compact and durable float valve which in addition to other advantageous features is constructed with a view of assuring free movement of the valve body and of utilizing the head of water to the best advantage in assisting in the closing of the valve and in holding the valve body to its seat when the float is raised by the water in the tank.

The invention will be fully understood from the following description and claims when the same are read in connection with the drawings, accompanying and forming part of this specification, in which:

Figure 1 is a side elevation of the float valve constituting the best practical embodiment of my invention of which I am cognizant, as the same appears when the valve-body is raised. Fig. 2 is a vertical section of the valve with the valve-body closed or in its lowermost position. Fig. 3 is a detail horizontal section, taken in the plane indicated by the line 3—3 of Fig. 2, looking downwardly.

Similar letters designate corresponding parts in all of the views of the drawings, referring to which:

A is the valve casing, exteriorly threaded at its lower end, as indicated by $a$, and having a lateral arm $b$, designed to be connected with a suitable source of water supply, and also having an interior shoulder $c$.

B is a pipe section having a flange $d$, designed to form a valve seat.

C is an interiorly threaded collar having for its office to connect the pipe section B and the casing A, and to clamp a yielding washer D between the valve seat and the interior shoulder $c$ of the casing.

E is a pipe movable endwise in the pipe section B and designed to conduct water from the casing A to the flushing tank (not shown).

F is a yoke straddling and fulcrumed at $e$ on the pipe section B and having bifurcations $f$ in its ends.

G is a rod fixed to and extending from the yoke and serving in combination with the same to form the lever to carry the float (not shown).

H is a diametrical rod extending through and movable vertically with the pipe E and disposed in the bifurcations $f$ of the yoke F, and arranged and adapted to move vertically in vertical guideways $g$ in the pipe section B.

I is the valve body of my improvements, and J is a rod extending between and connecting the valve body I and the before-mentioned diametrical rod H.

By virtue of the construction thus far described it will be manifest that when water is taken from the flushing tank and the float descends, the lever formed by the yoke F and the rod G will be rocked to open the valve—i. e., raise the valve body I from the valve seat, with the result that water will be permitted to pass through the arm $b$, the casing and the pipe E, and into the flushing tank, until the float is raised to a predetermined point when the valve will be closed, that is, the valve body I will be moved against the valve seat.

It will be observed by reference to Figs. 2 and 3, that the valve body I is movable rectilinearly in the casing A and at a right angle to and opposite the discharge end of the arm $b$; also, that the said valve body comprises the before-mentioned rod J, a collar $k$ threaded thereon, a washer $l$ mounted on the rod and disposed on the collar, and a cylinder $m$, preferably of metal, threaded on the rod and disposed immediately above the washer and having for its office to fit the interior of the casing A and hold the valve body against lateral deflection incidental to the rectilinear movements thereof under the action of the float. It will be plainly seen by reference to the figures mentioned that the said cylinder $m$ comprises an intermediate reduced portion and end flanges; also, that the said end flanges are notched or recessed as indicated by $n$. Thus it will be manifest that as the valve body approaches its seat, the notches or recesses $n$ will permit the head of water to occupy the casing A, and by bearing down on the washer $l$ and the cylinder $m$ assist in moving the valve body against its seat and in holding the said body against the seat so as to preclude leakage past the valve until water is again taken from the flushing tank in the manner before described.

It will be gathered from the foregoing that the cylinder m adds but little to the cost of the valve body, and yet assures true rectilinear movement of the valve body and prompt and effectual closing of the valve when the valve body is drawn downwardly; and it will also be gathered that my novel float valve as a whole is compact in construction and reliable in operation, and that it embodies no delicate parts such as are likely to get out of order after a short period of use.

As hereinbefore stated, the construction illustrated and described constitutes the best practical embodiment of my invention known to me, but it is obvious that in the future practice of the invention various changes in the form, construction and relative arrangement of the parts may be made within the scope of the claimed invention.

Having described my invention, what I claim and desire to secure by Letters-Patent, is:

1. The combination in a float valve, of a casing closed at its upper end and having a valve seat and an induction orifice disposed in its side above the valve seat, a valve body movable in the casing above the valve seat and opposite the induction orifice and comprising a washer adapted to bring up against the valve seat, and a cylinder fixed with respect to the washer and comprising an intermediate reduced portion and end flanges, the latter being of a size to snugly fit the interior of the casing and guide the valve body in its movements, and being provided with notches or recesses for the passage of water, a suitably supported float lever, and a connection intermediate the valve body and the float lever for moving the former by the latter.

2. The combination in a float valve, of a casing closed at its top and exteriorly threaded at its lower end and having an interior shoulder and also having a laterally disposed induction orifice above said shoulder, a pipe section flanged at its upper end and having vertical guideways, a collar engaging the threaded end of the casing and connecting the pipe section thereto, a washer interposed and held between the flanged end of the pipe section and the interior shoulder of the casing, a pipe movable endwise in the said pipe section, a rod extending diametrically through said pipe and disposed in the vertical guideways of the pipe section, a float lever having a yoke fulcrumed on and straddling the pipe section and receiving the diametrical rod, and a valve body movable in the casing above the said washer and opposite the induction orifice of the casing and comprising a rod extending down to and connected with the diametrical rod, a washer supported on said downwardly extending rod and adapted to bring up against the first named washer, and a cylinder supported on the rod above the second named washer and having an intermediate reduced portion and end flanges, the latter being of a size to snugly fit the interior of the casing and guide the valve body in its movements, and being provided with notches or recesses for the passage of water.

3. The combination in a float valve, of a casing having a valve seat and also having a laterally disposed induction orifice located above the valve seat, a valve body movable rectilinearly in the casing in a line intersecting the induction orifice and comprising a washer adapted to bring up against the valve seat, and a portion, of greater diameter than the washer, disposed at the opposite side of the washer, with reference to the valve seat, and snugly fitting in the casing to guide the valve body in its rectilinear movements, and having passages to enable the head of water to act directly against the washer and hold the same against the seat, and suitable means for moving the said valve body.

4. The combination in a float valve, of a casing having a valve seat and also having a laterally disposed induction orifice located above the valve seat, a valve body movable rectilinearly in the casing in a line intersecting the induction orifice and comprising a washer adapted to bring up against the valve seat, and a cylinder disposed at the opposite side of the washer, with reference to the valve seat, and having an intermediate reduced portion and end flanges, the latter being larger in diameter than the washer to snugly fit the casing and guide the valve body in its movements, and being provided with peripheral notches or recesses, and means for moving the said valve body.

In testimony whereof I have hereunto set my hand in presence of two subscribing witnesses.

LOUIS GUEDESSE.

Witnesses:
 GEORGE F. ROUSSEAU,
 ISABELLE SMITH.